Patented Sept. 25, 1951

2,568,737

UNITED STATES PATENT OFFICE 2,568,737

REVERSE DETERGENTS

Willard H. Kirkpatrick, Sugar Land, Tex., and Doyne L. Wilson, Bellflower, Calif., assignors to Visco Products Company, Houston, Tex., a corporation of Delaware No Drawing. Application March 13, 1947, Serial No. 734,534

8 Claims. (Cl. 252—161)

This invention relates to the chemical purification of contaminated surfaces, and more specifically to the reconditioning of surfaces which have been contaminated with water or other hydrophilic substances which tend to adhere to surfaces and which need to be substantially purged of traces of such contamination. For instance, metallic parts are often reduced to precisely finished shapes by machine tools while the temperature is kept down by a water containing coolant. Such a part, after air drying, even at elevated temperatures, in most instances will still retain a definite chemical contamination with water or other hydrophilic body, the presence of which can be ascertained by the fact that it is not readily wetted with oil. Another instance is the oil drums used to ship both lubricating and fuel oils. Especially when these are used for transoceanic shipment, after they have been emptied, they are likely to be seriously soiled or contaminated, both inside and outside. It is not uncommon to heat them with steam jets of very hot steam and to rinse them with caustic, either with or without a preliminary steam heating. In this way, it is possible to eliminate practically all the contamination except the residual water contamination left after the application of caustic or any other aqueous solution.

In many instances, such traces of water are more or less objectionable, sometimes to such an extent as to prevent further use of the container or to require lengthy and expensive reconditioning processes.

We have discovered that it is possible to treat such surfaces containing water or other hydrophilic substances which tend to stand thereon with a non-aqueous and hydrophobic liquid compatible with or frequently identical with the intended contents of the container or the rust-protecting preparation with which the machine part is to be coated, in which liquid is dissolved a percentage of a reagent dispersible or soluble in the liquid itself but also hydrophilic to such an extent that the chemical trace of water on the surface is taken into the applied liquid or rinse, so that the rinse can be poured off and leave the surface in a condition such that the hydrophobic material subsequently placed in contact with the container or machine part will readily wet it and find not even a chemical trace of water present at the contact surface.

In our co-pending application Serial No. 564,713, filed November 22, 1944, now United States Patent No. 2,435,925, issued February 10, 1948, we have described one solution to this problem, wherein an oil soluble amino salt of a coumarone-indene resin modified alkylated naphthalene sulfonic acid is employed. We have now found that excellent results can also be obtained with the oil soluble amine salts of petroleum diolefine polymer modified alkylated polycyclic sulfonic acids. A preferred material for the purpose of our invention is the oil soluble amine salt resulting from the condensation of an alkylated naphthalene sulfonic acid partially neutralized with an oil soluble amine and a polymer (e. g., a Gray tower polymer) resulting from the catalytic polymerization with a solid absorbent polymerizing catalyst of a vaporizable petroleum hydrocarbon containing polymerizable diolefine components, at least partly neutralized with ammonia or a water soluble amine. These products are water wettable and oil soluble. These and other products derived from petroleum diolefine polymers are disclosed and claimed as such in our co-pending application Serial No. 666,526, filed May 1, 1946.

In the practice of the present invention we prefer to polymerize the polymerizable components of the initial polymer with a suitable sulfonating polymerizing agent or catalyst (e. g. sulfuric acid, chlorosulphonic acid or sulfur trioxide) in the presence of and/or with the subsequent addition of a modifying substance which can introduce a group or groups into the resinoid molecule that will reduce the hydrophobe characteristics of the polymer and/or confer hydrophile characteristics on the resulting product. We have found the following modifying agents to be suitable for this purpose: monohydric aliphatic alcohols, for example, isopropyl alcohol, amyl alcohol, octyl alcohol, oleyl alcohol, etc.; the corresponding monoolefines to accomplish alkylation; polyhydric aliphatic alcohols, for example, ethylene glycol, polyethylene glycols, glycerine and its simple derivatives, organic amines having a replaceable hydrogen atom, for example, aliphatic primary and secondary monoamines, e. g., methylamine, ethylamine, propylamine, butylamine, amylamine, octylamine, dimethylamine, cyclohexylamine, dicyclohexylamine, and homologues thereof; aralkylamines, e. g., benzylamine, dibenzylamine; alkylolamines, e. g., monoethanolamine, diethanolamine, monopropanolamine, dipropanolamine, and higher homologues; polyamines, for example, ethylene diamine, diethylene triamine, triethylene tetramine, tetraethylene pentamine, metaphenylene diamine, o-phenylene diamine, benzidine, p-phenylene diamine, 2,4-diamino diphenylamine, 4,4'-diaminodiphenyl ether, and homologues thereof; aromatic amines, e. g., aniline o, m, or p toluidines, xylidines, o, m, or p anisidines, o, m, or p phenetidines, alpha or beta naphthylamine, and homologues thereof, alkylolamines polymerized with the removal of chemically available water, alkylolamines polymerized in the presence of an acidic condensation catalyst (e. g., zinc chloride) with or without substantial removal of water, for instance, polymerized triethanolamine or mixtures thereof with diethanolamine, and homologues; aromatic sulfonic acids, e. g., naphthalene sulfonic acid; sulfonated diphenyl, sulfonated anthracene and other polynuclear sulfonates; nuclear substituted derivatives of aromatic sulfonic acids, e. g., diamylisopropylnaphthalene sulfonic acid and other alkylated sulfonated polynuclear aromatic hydrocarbons; sulfo-fatty acids, e. g., sulforicinoleic acid, Twitchell type sulfo-acids, e. g., benzenestearosulfonic-acid, naphthaleneoleosulfonic-acid; copolymeric resinophore bodies, e. g., styrene, Diels-Alder adduct (addition of maleic anhydride (1, 4) to a conjugated system) etc.; and additive reactions under controlled conditions, such as, oxidation with air, reaction with epoxy compounds (e. g., ethylene oxide) halogenation with or without hydrolysis, and other reactions capable of conferring water wettability or hydrophile characteristics on the resultant product.

From the standpoint of convenience in handling and using the finished products, it is to be desired that the residual acidity of the product be neutralized with some suitable alkaline material, such as ammonia, lime, caustics, and organic bases, such as amines and hydroxyamino bodies. The solubility characteristics of the products may be further modified by the proper selection of the substance used to neutralize the residual acidity. Amines such as dicyclohexylamine and cyclohexylamine confer water insolubility and oil solubility to the finished product, resulting in maximum hydrophobic characteristics. On the other hand, amines such as ethylamine, isopropylamine, monoethanolamine, etc., confer water solubility and oil insolubility to the finished product, resulting in maximum hydrophilic characteristics. Likewise, other amines, such as, butylamine, diethanolamine, confer intermediary solubilities resulting in characteristics between the hydrophobe and hydrophile extremes. Inorganic alkaline neutralizing agents usually confer predominantly hydrophilic characteristics on the resultant products.

In preparing one suitable reagent for the practice of the invention we employ the following ingredients:

1. Amyl naphthalene: A mixture of monoamyl- and diamyl-naphthalenes having the following specifications:

Sp. G. at 20°, 0.94–0.96
MW, 231–56
Engler distillation by ASTM method D-86-35 modified as outlined in Sharples Standard Practice Instructions.
1 cc. not below 250° C.
95% between 250° C.–400° C.

2. Isopropanol — Regular 99% commercial grade.

3. Sulfuric acid — Regular 98% commercial grade.

4. Cyclohexylamine — Regular commercial grade.

5. Ammonia — Regular 26° Bé. commercial grade.

6. Gas oil — common commercial grade.

7. Gray tower polymer: A polymer resulting from passing cracked petroleum hydrocarbons containing diolefine components over fuller's earth. A typical Gray tower polymer may be prepared under the following conditions to produce products having the properties described.

*Operating data*

| | |
|---|---|
| Clay capacity per tower (tons) | 30 |
| Number of towers | 3 |
| Diameter and height (feet) | 10 x 30 |
| Depth of clay bed (feet) | 6 |
| Time of contact (minutes) | 35 |
| Entering temperature (°F.) | 396–412 |
| Leaving temperature (°F.) | 384 |
| Pressure (p. s. i.) | 100 |
| Pressure drop (p. s. i.) | 15 |
| Finished gasoline (bbls./24 hours) | 2000 |
| Clay mesh | 30–60 |
| Source of clay: | Tennessee Clay Company Attapulgus. |

*Physical characteristics of Gray tower polymer obtained*

| | |
|---|---|
| Gravity °A. P. I. | 27.5 |
| Bromine No. | 9.26 |
| Iodine No. | 9.48 |
| Aromatic compounds per cent | 28 |

*Distillation*

| | |
|---|---|
| Initial boiling point | 382 |
| 5% | 391 |
| 10% | 394 |
| 20% | 398 |
| 30% | 404 |
| 40% | 409 |
| 50% | 416 |
| 60% | 426 |
| 70% | 448 |
| 80% | 504 |
| 90% | 624 |
| End point | 688 |
| Recovered | 97.0 |
| Residue | 3.0 tar |

It will be understood that the foregoing Gray tower polymer represents a typical example and that the invention is not limited to the use of polymerizable substances having the specific physical characteristics described. It is important for the purpose of the invention, however, that the polymer employed as a starting material be one which is derived by the polymerization of petroleum hydrocarbons containing diolefine components.

The following data will illustrate some of the variable operating conditions of Gray towers:

| | |
|---|---|
| Capacity | 80 to 12,000 bbls./day |
| Diameter (ft.) | 5–25 |
| Depth of clay bed (ft.) | 6–25 |
| Time of contact (seconds) | 20–400 |
| Temperature (°C.) | 121–246 |
| Temperature (°F.) | 250–475 |
| Pressure (pounds per sq. in.) | 5–380, usually 50–100 |
| Pressure drop (pounds per sq. in.) | 2–50 |
| Throughput | 800–27 M bbls./day |

Under normal conditions the fuller's earth is changed one to four times a month, depending upon the quality of the gasoline.

The fuller's earth (clay) which have been successfully used for Gray tower processes include Attapulgus, Floridin, Olmstead earth, and Riverside, Texas, earth.

The diolefines present in the low boiling fractions of cracked gasolines which are treated by the Gray tower process, the Houdry process and other procedures of a similar nature for the removal of the diolefines usually do not exceed 0.1% of the total gasoline in a mixed phase cracked gasoline but the diolefine content is much higher in a vapor phase cracked gasoline amounting to 1% or more. Among the diolefines which have been identified in a vapor phase cracked gasoline are butadiene, piperylene, isoprene and cyclopentadiene.

The formation of diolefines in cracking may be considerable under certain conditions. Tropsch et al. (Ind. Eng. Chem. 30, 169 (1938)) cracked a Pennsylvania gas oil at 950 degrees C., produced 6.6% butadiene, 3.1% pentadiene, and 7.2% higher conjugated dienes.

Tests which have been conducted with various diolefines have indicated that the following compounds found in cracked gasolines are very susceptible to polymerization:

2,3-pentadiene
  1,3-pentadiene
  2-methyl-1,3-butadiene
  2,4-hexadiene
  1,3-cyclopentadiene
  1,3-cyclohexadiene The polymers formed in the Gray process are liquid but upon exposure to air they gradually harden to a solid gum. The specific gravity is usually about 0.800 to 0.900 and the boiling range from about 185 degrees F. to 700 degrees F. The present invention contemplates the use of polymers within this boiling range or fractions thereof, but the higher boiling fractions, e. g., fractions boiling within the range from 382 degrees F. to 688 degrees F. are preferred.

It may be noted that these petroleum polymers are complex compositions which are quite different in chemical composition from coumarone-indene fractions derived from coal tar.

To produce a reagent according to the invention, 3500 pounds of amylnaphthalene and 350 pounds of isopropanol are mixed and 4800 pounds of 98% sulfuric acid is added at a temperature not exceeding 45 degrees C. Sulfonation is carried out at a temperature of 60 degrees C. by maintaining at this temperature for two hours to yield an alkylated naphthalene sulfonic acid. The free acid is then washed out by dumping the reaction product into cold water while cooling to keep the temperature below 80 degrees C. The amount of cold water used is such that the final wash water at room temperature should not be less than 38 degrees Bé. nor more than 41 degrees Bé. About 4000 pounds of water will usually give a result within the limits stated. 1200 pounds of a petroleum fraction which we designate gas oil and which is not much different than a high boiling kerosene is usually added in the washing process. This permits a more ready stratification of the two layers. After settling over night, the clear upper layer is recovered. A convenient way to do this is to drain off the wash water which constitutes the lower layer, leaving the upper layer in the process kettle. To this, 375 pounds of cyclohexylamine is added and the temperature is brought up to 110 degrees C., whereby the basic amine reacts with the alkylated naphthalene sulfonic acid to reduce the acidity of the resultant molecule. At this point 1153 pounds of Gray tower polymer is added and the temperature raised to 115 degrees C. where it is maintained for two hours. Under such conditions the Gray tower polymer condenses with the partially amino-reacted alkylated naphthalene sulfonate to form a liquid Gray tower polymer modified alkylated naphthalene sulfonate. After this lapse of time, the source of heat is removed from the kettle and the temperature is allowed to fall to about 105 degrees C., and then 110 to 150 gallons of water are added and thoroughly stirred. The acid wash water is allowed to settle and discharged to waste and the residual acidity of the mass is neutralized to methyl orange alkalinity with 26 degrees Bé. ammonia. The ammonium sulfate solution is allowed to settle out and if necessary the product is brightened by heating to about 105 degrees C. to remove any water present in suspension. This completes the product and it is now ready for packaging.

Instead of the 375 pounds of cyclohexylamine, 425 pounds of monobutylamine may be used in preparing a suitable composition, the procedure previously described otherwise being the same.

The proportions of the different ingredients may be varied considerably. Without attempting to state definitely just what the extreme limits are, it is stated that, beginning with 2625 lbs. of amylnaphthalene, the isopropanol may be from 275 to 330 pounds. The sulfuric acid is present in excess and therefore the amount can be indefinite. The petroleum fraction may be between 1000 and 1400 pounds; the cyclohexylamine or monobutylamine may be from 360 to 460 pounds; and the Gray tower polymer from 1000 to 1200 pounds. The 150 gallons of water is merely wash water and therefore the amount is indefinite.

The material is best prepared for actual use by dissolving it in suitable hydrocarbon solvent for ease in application and handling. Such solvents as benzene, toluene, unleaded gasoline, kerosene, naphtha, gas oil, fuel oil, diesel oil, bunker oil, and various alcohols, ketones, chlorinated aliphatics, organic sulphides, and carbon tetrachloride may be employed.

The ratio of the reagent to solvent may vary from somewhat less than 1% to essentially 100% reagent, depending upon conditions. For instance, for the general rinsing of drums or containers, a 5% solution of the reagent in ordinary commercial unleaded gasoline functions very well, but if the containers to be treated are heavily coated with water, a higher percentage is preferable so that the rinse will not be exhausted too quickly.

After an extended period of use, the rinse will merely become weak and when this occurs it can be set aside and a layer containing substantially 100 per cent water together with only traces of reagent will accumulate at the bottom on standing and can be drained off. Similarly, where treatment is by dipping parts in a reservoir, the bottom of the vessel is best formed with a sump and a valve to drain the same and the accumulated water may be drained off from time to time without interrupting the use of the bath. Water thus drained off contains such small amounts of the reagent that the loss is negligible, and treatment to recover the reagent is not worthwhile.

Having thus described the invention, what we claim as new and desire to secure by Letters Patent of the United States is:

1. The method of conditioning surfaces for use under conditions such that traces of water constitute a contaminant which comprises rinsing the surfaces with a non-aqueous rinse comprising essentially a non-aqueous hydrophobic organic solvent in which is dissolved an oil soluble amine salt of a petroleum diolefine polymer condensed with an alkylated polycyclic sulfonic acid.

2. The method of conditioning surfaces for use under conditions such that traces of water constitute a contaminant which comprises rinsing the surfaces with a non-aqueous rinse comprising essentially a non-aqueous hydrophobic organic solvent in which is dissolved an oil soluble amine salt of a Gray tower polymer condensed with an amyl naphthalene sulfonic acid.

3. A rinse for removing hydrophilic contaminant from solid surfaces comprising essentially a non-aqueous hydrophobic organic solvent in which is dissolved an oil soluble amine salt of a petroleum diolefine polymer condensed with an alkylated polycyclic sulfonic acid.

4. A rinse for removing hydrophilic contaminant from solid surfaces comprising essentially a non-aqueous hydrophobic organic solvent in which is dissolved an oil soluble amine salt of a Gray tower diolefine polymer condensed with an amyl naphthalene sulfonic acid.

5. The method of conditioning surfaces for use under conditions such that traces of water constitute a contaminant which comprises rinsing the surfaces with a rinse comprising essentially a hydrocarbon solvent in which is dissolved an oil-soluble amine salt resulting from partially neutralizing the condensation product of isopropyl alcohol, amyl naphthalene and concentrated sulfuric acid with an oil soluble amine and condensing said product with a polymer resulting from the catalytic polymerization with a solid absorbent polymerizing catalyst of a vaporizable petroleum hydrocarbon containing polymerizable diolefine components followed by further at least partial neutralization with ammonia.

6. A rinse for removing hydrophilic contaminant from solid surfaces comprising essentially a hydrocarbon solvent in which is dissolved an oil soluble amine salt resulting from partially neutralizing the condensation product of isopropyl alcohol, amyl naphthalene and concentrated sulfuric acid with an oil soluble amine and condensing said product with a polymer resulting from the catalytic polymerization with a solid absorbent polymerizing catalyst of a vaporizable petroleum hydrocarbon containing polymerizable diolefine components followed by further at least partial neutralization with ammonia.

7. The method of conditioning surfaces for use under conditions such that traces of water constitute a contaminant which comprises rinsing the surfaces with a rinse comprising essentially a hydrocarbon solvent in which is dissolved the product obtained by partially neutralizing the condensation product of isopropyl alcohol, amyl naphthalene and concentrated sulfuric acid with cyclohexylamine and reacting the resultant product with a Gray tower diolefine polymer followed by neutralization to methyl orange alkalinity with ammonia.

8. A rinse for removing hydrophilic contaminant from solid surfaces comprising essentially a hydrocarbon solvent in which is dissolved the product obtained by partially neutralizing the condensation product of isopropyl alcohol, amyl naphthalene and concentrated sulfuric acid with cyclohexylamine and reacting the resultant product with a Gray tower diolefine polymer followed by neutralization to methyl orange alkalinity with ammonia.

WILLARD H. KIRKPATRICK.
DOYNE L. WILSON.

REFERENCES CITED

The following references are of record in the file of this patent:

UNITED STATES PATENTS

| Number | Name | Date |
| --- | --- | --- |
| 2,126,839 | Suthard | Aug. 16, 1938 |
| 2,137,404 | Hollerer | Nov. 22, 1938 |
| 2,207,808 | Lamme | July 16, 1940 |